March 21, 1961                J. E. BURKE                 2,975,476
                                PRESS
                         Filed March 2, 1959
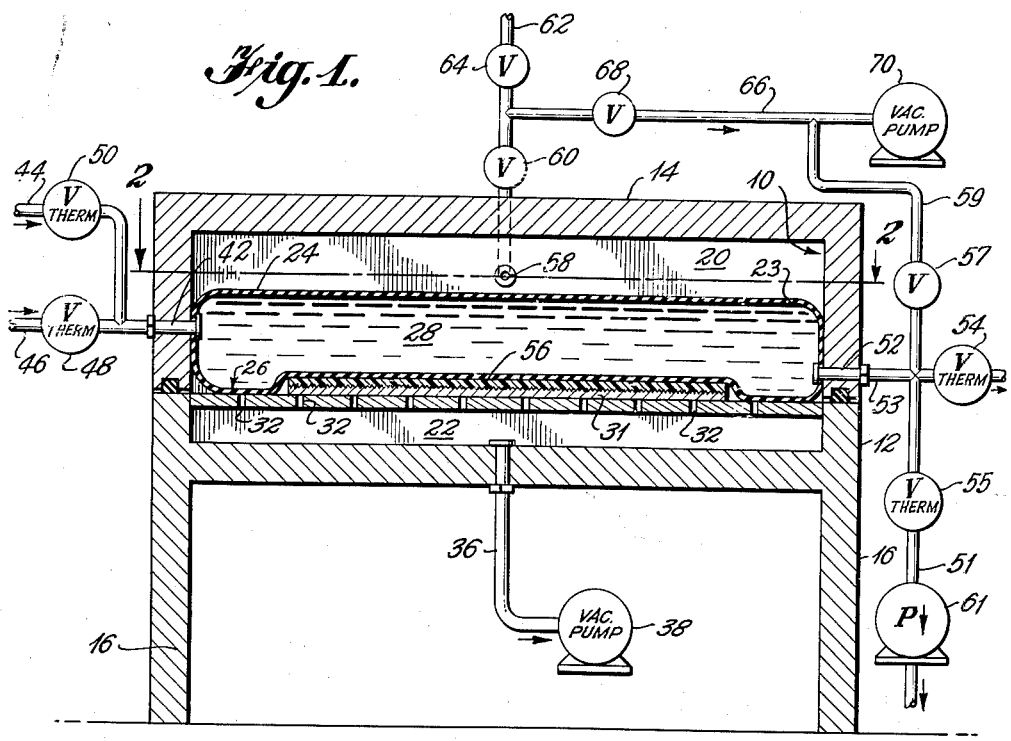
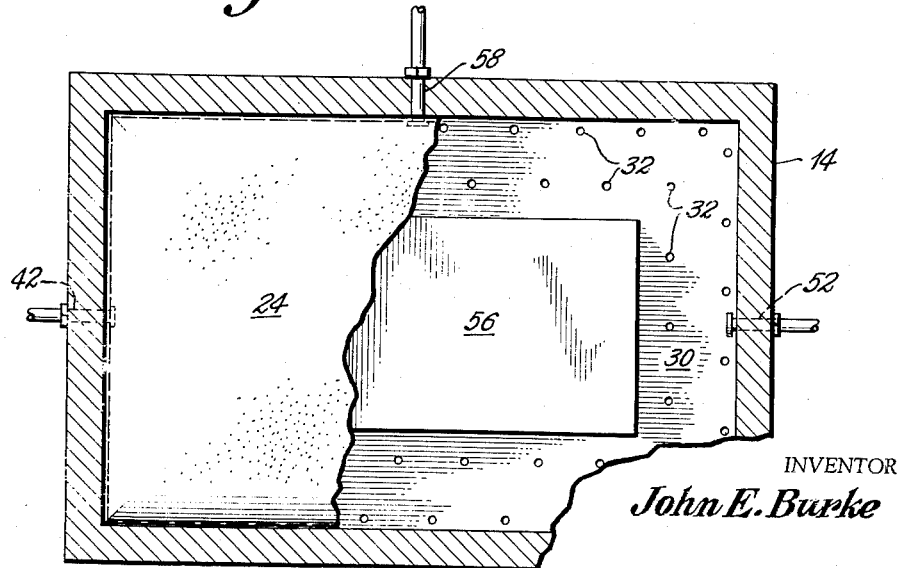
INVENTOR
John E. Burke
BY Sughrue, Rothwell, Mion and Zinn
ATTORNEYS United States Patent Office 2,975,476
Patented Mar. 21, 1961

2,975,476
PRESS
John E. Burke, Rte. 1, New Berlin, Ill.
Filed Mar. 2, 1959, Ser. No. 796,329
4 Claims. (Cl. 18—17)

This invention relates to improvements in presses. More particularly, this invention relates to a press of the type having a flexible pressing surface together with means for providing controlled temperature at the flexible pressing surface, and an inflexible pressing surface.

The press of this invention has special application in the printing art and may be utilized for molding a thermo plastic matrix, which matrix may be subsequently used as a mold for making a printing plate in accordance with the process disclosed in my copending application Serial No. 748,330, now abandoned, filed July 14, 1958. The press of this invention may also be utilized directly in the making of a plastic printing plate.

In the printing art, it is conventional to make a printing plate from a mold or matrix. This mold or matrix is further made from an engraving or other type of relief by various means such as molding a sheet of thermoplastic material or paper matrix of the engraving or other relief printing. It is usually necessary to apply heat through a blanket to render the plastic sufficiently pliable to allow it to be molded onto the relief of the engraving or other surface and after molding the matrix must harden, this hardening usually takes place through the use of cooling liquids placed in the cores of the metal platens of the press. Therefore, if a pressing medium having an improved means for holding the mold and a flexible pressing surface with heat transfer fluid were to be utilized, the mold could be made quickly by transferring heat to the thermoplastic sheet material for softening and molding the same by applying pressure to the flexible surface thereof to mold the sheet and then applying cold liquid to the pressing surface to cool, cure and harden the so-molded sheet.

In my copending application mentioned above for a method of making printing plates, a mold or matrix is utilized in casting a plastic plate from a liquid plastic resin which is workable at room temperature. Also, better results may be obtained when using some types of plastic by applying a vacuum to the plastic in the mold to withdraw most of the air therefrom. This vacuum may then subsequently be released to insure the plastic is packed into the interstices of the mold. After molding, the plate may be allowed to cure and harden at room temperature while not being moved. By the use of the press of this invention the same operation can be accomplished and the curing time will be substantially reduced by transferring heat at a surface contacting the casted plastic and subsequently cooling the casted printing plate at this surface.

Accordingly, it is the principal object of this invention to provide a press having a flexible pressing surface and means for transferring heat and cold to and from the pressing surface and to the thermoplastic material.

It is an additional object of this invention to provide means for controlling the heat and cooling transfer and pressure at the pressing surface and this control may be automatic with regard to temperature, time and pressure.

Other objects and advantages of this invention will be pointed out in the following detailed description and claims when taken in connection with the accompanying drawing, which discloses, by way of example, the principles of this invention and the best mode which has been contemplated of applying these principles.

In the drawing:

Fig. 1 is a sectional elevation view, partly schematic, of the press of this invention as utilized for molding and hardening a mold or matrix;

Fig. 2 is a sectional plan view taken generally along line 2—2 of Fig. 1 showing various sections of the device.

In general, the invention includes an enclosed chamber which is divided into upper and lower portions by a flexible bag which is secured to all sides of the upper portion of the chamber. The lower portion of the chamber will include a work support with a vacuum chamber and the upper portion on the other side of the flexible bag includes means for applying either pressure or a vacuum to the upper side of the flexible bag. The interior of the flexible bag is in fluid communication with inlet and outlet conduits through which liquid may be circulated at a controlled temperature to control the temperature of the flexible pressing surface of the bag. By this arrangement, any device which is subjected to the pressing action of the bag may also have its temperature controlled and by applying vacuum to the lower portion of the chamber beneath the bag, we can by evacuation of excess air eliminate "blind spots," i.e. entrapped air, in the mold which are made up of the balance of air remaining between the thermoplastic material and the original or type form, after the application of normal pressure. This elimination of air and "blind spots" will permit molecular expansion of the chemical constituents of the thermoplastic material, thus giving greater refinement of detail in the finished product.

Referring to the drawing, the press may include an enclosed chamber 10 which is divided into a bottom portion 12, and a movable or hinged top portion 14. The bottom portion 12 may be supported on suitable legs 16 or the like. The top portion 14 is removable from the bottom portion 12 and at the point of engagement a suitable gasket 18 may be provided to insure that the chamber 10 is completely sealed from the ambient. Enclosed press chamber 10 contains an upper space or compartment 20 and a lower space or compartment 22 separated by a flexible bag 23 having an upper side 24 and a lower side 26 to define a fluid cavity 28 therebetween. The bag 23 is secured to the edges of the upper portion 14 so that upper space 20 and lower space 22 are not in fluid communication with each other.

A suitable work support 30 having perforations 32 distributed therein is secured to the bottom portion 12 of the enclosed press chamber and this work support 30 also functions as part of a vacuum hold-down.

Suitable means are provided for controlling the application of a fluid such as a controlled temperature liquid to the cavity 28 within the flexible bag. The bag is in fluid communication with a liquid inlet by a pipe 42 which is connected to hot and cold liquids or chemical supplies 44 and 46 to control the temperature of the liquid contained within cavity 28 in the flexible bag. The thermostat valves 48 and 50 may be adjustable to adjust the temperature of the fluid and may further be time programmed to apply one temperature liquid for a certain time and another temperature liquid for another time. Fluid is circulated within cavity 28 in the flexible bag and then may exit through conduit 52. Conduit 52 is lower than inlet 42 to aid in draining.

The liquid may exit through either cold liquid pipe 51 through valve 55 and cold liquid pump 61 to a cold liquid reservoir (not shown), or through hot liquid pipe 53 and thermostat valve 54 to a hot liquid reservoir (not shown). Thus the hot and cold liquids may be recirculated. Conduit 59 and valve 57 may be utilized to initially apply a vacuum to the interior 28 of bag 23.

For controlling the application of the bottom 26 of the flexible bag to a moldable material such as sheet thermoplastic 56, a suitable control pressure or vacuum may be applied to the upper space 20 through conduit 58. This air pressure or vacuum is controlled by a valve 60 and air pressure may be applied through conduit 62 controlled by valve 64 or alternatively a vacuum may be drawn through conduit 66 controlled by valve 68 and connected to a vacuum pump 70. It will be understood that all the fluid conections and valves are shown schematically and quick couplings and/or flexible conduits may be installed such that the top portion 14 of the closed press chamber 10 may be removed or opened for removing the work and loading additional work therein.

The operation of the press will now be described. A suitable original or type form 31 may be placed on work support 30 and a moldable sheet material 56 may be placed on the face of the original or type form 31 and the lower part 26 of the flexible bag 23 may be applied thereto. The openings 32 in support 30 allow vacuum pump 38 to apply a vacuum through conduit 36 to chamber 22 and exhaust any air between sheet 56 and the original 31. The cavity 28 defined within the flexible bag 23 is first evacuated by opening valve 57 to prevent vacuum in space 22 from forming seal at lower edge 26 of the bag 23. The bag is then supplied with a suitable liquid at any desired temperature as controlled by thermostat valves 48 and 50. The heat within cavity 28 is transferred through the bag walls 26 to the moldable sheet substance 56 to aid in the molding. At the same time a pressure may be applied by opening valves 64 and 60 and closing valve 68 to force the bag surface 26 downwardly against the top surface of thermoplastic sheet material 56 as shown in Fig. 1.

If the apparatus of this invention is utilized to make a printing plate according to the teachings of my aforesaid copending application, it is desirable to create a vacuum in the casting plastic. This may be done by applying a vacuum to the lower chamber 22 by opening valves 36 and allowing vacuum pump 36 to pull a vacuum in chamber 22. This will create a vacuum in the portion below the bag and above the work support 30, thereby withdrawing any air from the thermoplastic 56. This again will allow molecular expansion as explained above and permit greater refinement in detail in the cast plastic printing plate.

For molding some plastic substances it is very desirable to apply a cold fluid to the molded substance in order to enhance the curing and hardening thereof. This may be done by applying a cold liquid to cavity 28. The heat is then withdrawn from the moldable material and the curing thereof may be thereby expedited.

With this single press for applying pressure to or drawing a vacuum from a moldable thermoplastic in combination with heat transfer means at a flexible pressure surface, the press may be utilized for making either a moldable matrix or a plastic printing plate, thus eliminating any need for separate presses. For example, the matrix or mold is made according to the procedure described above wherein a sheet of thermoplastic material 56 overlying an original or type form 31 or the like is first softened by hot liquid circulated in cavity 28. Then vacuum is applied to lower chamber 22 and pressure is applied to upper chamber 20 to mold the thermoplastic material. Then the hot liquid in cavity 28 is replaced with cold liquid, and this will speed up the hardening and curing of the thermoplastic mold. The operation of making a plastic printing plate with the mold or matrix made as described above may be accomplished as described in my aforesaid copending application and the curing may be enhanced by circulating or applying a fluid at a desired temperature within cavity 28 of the flexible bag to make a plastic printing plate.

It will be evident that the invention described above will allow the temperature to be controlled and the pressure to be maintained constant throughout the molding area thus allowing constant coherence between the original or type form and moldable or castable material at all times throughout the entire molding and hardening process.

Although the invention has been described in terms of making a matrix or a printing plate such as used in the printing art, the invention is not limited thereto but could be used anywhere it is desirable to provide a flexible pressing surface having means incorporated in said surface for constant transfer and control of temperature to the article to be pressed and means for applying a variable pressure by said surface to be pressed.

While there have been shown and described and pointed out the fundamental novel features of this invention as applied to the preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the appended claims and reasonable equivalents thereof.

What is claimed is:

1. A press adapted to apply a presure to an article and at the same time control the temperature of the pressing surface applied during the pressing operation, said press comprising; a closed chamber, means for supporting an article to be pressed within said chamber, a hollow flexible bag dividing said chamber into two separate compartments which are out of fluid communication with each other, the article supporting means being located in the lower of said compartments, means for supplying fluid pressure to the other of said compartments, said fluid pressure causing said bag to exert a pressure on said article being supported, means for supplying a fluid at a controlled temperature to the interior of said flexible bag for the purpose of controlling the temperature of a pressing surface of the flexible bag and thereby controlling heat transfer to said article being pressed, said fluid pressure supplying means and said fluid supplying means being subject to independent control.

2. A device as defined in claim 1 further comprising thermostatic valve means controlling the application of fluid to said flexible bag and wherein said fluid is a liquid.

3. A device as defined in claim 2 further comprising means for drawing a vacuum in said compartment of said chamber which contains the article to be pressed.

4. A press having a controlled temperature flexible pressing surface for casting plastic printing plates, molding matrices, and the like, said press comprising; a closed chamber, work support means for supporting work to be pressed within said chamber, a spaced wall flexible bag dividing said chamber into two compartments, means to supply an absolute pressure to the top section of said chamber, means to supply a fluid to the interior of said bag for controlling temperature at the pressing surface thereof, and means to supply a vacuum to the lower compartment of said chamber.

References Cited in the file of this patent
UNITED STATES PATENTS

| | | |
|---|---|---|
| 1,699,288 | Frischer | Jan. 15, 1929 |
| 2,331,296 | Bendix | Oct. 12, 1942 |
| 2,401,299 | Glavin | June 4, 1946 |
| 2,694,227 | Fordyce et al. | Nov. 16, 1954 |